(12) United States Patent  
Schwabel et al.

(10) Patent No.: US 7,887,608 B2
(45) Date of Patent: Feb. 15, 2011

(54) AGGLOMERATE ABRASIVE GRAINS AND METHODS OF MAKING THE SAME

(75) Inventors: Mark G. Schwabel, Lake Elmo, MN (US); Dwight D. Erickson, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 34 days.

(21) Appl. No.: 12/138,498

(22) Filed: Jun. 13, 2008

(65) Prior Publication Data

US 2008/0236051 A1    Oct. 2, 2008

Related U.S. Application Data

(62) Division of application No. 11/252,955, filed on Oct. 18, 2005, now Pat. No. 7,399,330.

(51) Int. Cl.
*B24D 3/02* (2006.01)

(52) U.S. Cl. .......................... 51/307; 428/357

(58) Field of Classification Search ............ 51/307, 51/308, 309; 428/357
See application file for complete search history.

(56) References Cited

U.S. PATENT DOCUMENTS

| | | | |
|---|---|---|---|
| 2,860,450 A | | 11/1958 | Case |
| 2,885,366 A | * | 5/1959 | Iler ..................... 516/90 |
| 2,958,593 A | | 11/1960 | Hoover et al. |
| 3,269,815 A | | 8/1966 | Koopman |
| 3,486,929 A | * | 12/1969 | Anspon et al. ......... 428/523 |
| 3,658,748 A | * | 4/1972 | Andersen et al. ........ 523/220 |
| 3,864,443 A | | 2/1975 | Hopkins |
| 4,115,077 A | * | 9/1978 | Fukuda ................. 51/296 |
| 4,230,765 A | * | 10/1980 | Takahashi et al. ....... 428/331 |
| 4,311,489 A | | 1/1982 | Kressner |
| 4,543,107 A | | 9/1985 | Rue |
| 4,588,419 A | | 5/1986 | Caul et al. |
| 4,652,275 A | | 3/1987 | Bloecher et al. |
| 4,734,104 A | | 3/1988 | Broberg |
| 4,737,163 A | | 4/1988 | Larkey |
| 4,741,743 A | | 5/1988 | Narayanan et al. |
| 4,751,138 A | | 6/1988 | Tumey et al. |
| 4,799,939 A | | 1/1989 | Bloecher et al. |
| 4,800,685 A | | 1/1989 | Haynes, Jr. |
| 4,898,597 A | | 2/1990 | Hay et al. |
| 4,903,440 A | | 2/1990 | Larson et al. |
| 4,997,461 A | | 3/1991 | Markhoff-Matheny et al. |
| 5,038,453 A | | 8/1991 | Kurita et al. |

(Continued)

FOREIGN PATENT DOCUMENTS

WO    WO 95/24991    9/1995

(Continued)

*Primary Examiner*—Jerry Lorengo
*Assistant Examiner*—Ross J Christie
(74) *Attorney, Agent, or Firm*—Scott A. Baum

(57) ABSTRACT

An abrasive agglomerate includes a plurality of abrasive grains bonded together in a three-dimensional structure by a substantially continuous, non-porous inorganic binder, wherein the abrasive grains have an average size of between about 0.5 microns and about 1500 microns, the inorganic binder is less than about 75 percent, by weight, of the abrasive agglomerate, and the bulk density of the abrasive agglomerate is less than about 90 percent of the bulk density of the abrasive grains.

11 Claims, 6 Drawing Sheets

U.S. PATENT DOCUMENTS

| | | |
|---|---|---|
| 5,039,311 A | 8/1991 | Bloecher |
| 5,061,294 A | 10/1991 | Harmer et al. |
| 5,094,672 A | 3/1992 | Giles, Jr. et al. |
| 5,110,332 A | 5/1992 | Isaksson |
| 5,118,326 A | 6/1992 | Lee et al. |
| 5,131,926 A | 7/1992 | Rostoker et al. |
| 5,137,542 A | 8/1992 | Buchanan et al. |
| 5,152,917 A | 10/1992 | Pieper et al. |
| 5,203,884 A | 4/1993 | Buchanan et al. |
| 5,203,886 A | 4/1993 | Sheldon et al. |
| 5,236,472 A | 8/1993 | Kirk et al. |
| 5,282,875 A | 2/1994 | Wood et al. |
| 5,378,251 A | 1/1995 | Culler et al. |
| 5,417,726 A | 5/1995 | Stout et al. |
| 5,427,595 A | 6/1995 | Pihl et al. |
| 5,436,063 A | 7/1995 | Follett et al. |
| 5,443,906 A | 8/1995 | Pihl et al. |
| 5,489,318 A * | 2/1996 | Erickson et al. ............... 51/309 |
| 5,496,386 A | 3/1996 | Broberg et al. |
| 5,520,711 A | 5/1996 | Helmin |
| 5,549,962 A | 8/1996 | Holmes et al. |
| 5,590,703 A | 1/1997 | Eckert |
| 5,609,706 A | 3/1997 | Benedict et al. |
| 5,645,619 A * | 7/1997 | Erickson et al. ............... 51/309 |
| 5,679,067 A | 10/1997 | Johnson et al. |
| 5,738,696 A | 4/1998 | Wu |
| 5,863,308 A | 1/1999 | Qi et al. |
| 5,903,951 A | 5/1999 | Ionta et al. |
| 5,919,549 A * | 7/1999 | Van et al. .................... 428/141 |
| 5,954,844 A | 9/1999 | Law et al. |
| 5,961,674 A | 10/1999 | Gagliardi et al. |
| 5,975,988 A | 11/1999 | Christianson |
| 6,080,216 A * | 6/2000 | Erickson ...................... 51/309 |
| 6,228,134 B1 * | 5/2001 | Erickson ...................... 51/309 |
| 6,264,710 B1 * | 7/2001 | Erickson ...................... 51/309 |
| 6,518,349 B1 * | 2/2003 | Felix et al. ................... 524/492 |
| 6,551,366 B1 | 4/2003 | D'Souza et al. |
| 6,620,214 B2 | 9/2003 | McArdle et al. |
| 6,669,749 B1 | 12/2003 | Rosenflanz et al. |
| 6,773,474 B2 | 8/2004 | Koehnle et al. |
| 6,790,126 B2 | 9/2004 | Wood et al. |
| 6,881,483 B2 | 4/2005 | McArdle et al. |
| 7,399,330 B2 * | 7/2008 | Schwabel et al. ............. 51/307 |
| 2002/0025435 A1 * | 2/2002 | Hansen et al. ............... 428/403 |
| 2002/0160694 A1 | 10/2002 | Wood et al. |
| 2003/0236062 A1 * | 12/2003 | Li et al. ...................... 451/540 |
| 2005/0022455 A1 * | 2/2005 | Dazza et al. .................. 51/307 |
| 2005/0032468 A1 | 2/2005 | Hunt et al. |

FOREIGN PATENT DOCUMENTS

| | | |
|---|---|---|
| WO | WO 9700836 A1 * | 1/1997 |
| WO | WO 9954424 A1 * | 10/1999 |
| WO | WO 9954425 A1 * | 10/1999 |

* cited by examiner

AGGLOMERATE ABRASIVE GRAINS AND METHODS OF MAKING THE SAME

CROSS REFERENCE TO RELATED APPLICATIONS

This application is a divisional of U.S. Pat. No. 7,399,330 issued on Jul. 15, 2008 to Schwabel et al. and assigned to 3M Innovative Properties Company Ser. No. 11/252,955, filed Oct. 18, 2005, disclosure which is incorporated by reference in its entirety herein.

FIELD OF INVENTION

This invention relates to abrasive agglomerates that can be used in a variety of abrasive articles, including bonded abrasives, coated abrasives, nonwoven abrasives, and abrasive brushes.

BACKGROUND

Abrasive grits or grains have long been used in abrasive articles, including coated abrasives, bonded abrasives, and non-woven abrasives. Abrasive grits traditionally have comprised fine particles of a hard substance, such as alumina, alumina zirconia, diamond, cubic boron nitride, and sol-gel-derived abrasive particles. Criteria used in evaluating the effectiveness of a particular abrasive particle used for a particular abrading application typically include abrading life, rate of cut, substrate surface finish, grinding efficiency, and product cost.

Such traditional grits are effective in the removal of material from a workpiece for a short period of time, however many grits become smoothed or polished over time such that little additional material is removed. When a substantial number of the abrasive grits become smoothed, the abrasive article typically becomes less effective in abrading the workpiece. Moreover, as more and more of the abrasive grits become smoothed over time, the cut rate of the abrading article may become inconsistent.

To address the inconsistent cut rates over time, abrasive agglomerates have been developed. Abrasive agglomerates have a plurality of abrasive grits held together with an organic or inorganic binder. The binder is usually more friable than the abrasive grits so that the binder fractures to release used-up abrasive grits before they become smoothed or polished, exposing fresh abrasive grits to the workpiece.

SUMMARY

In one aspect, the present disclosure provides an abrasive agglomerate comprising a plurality of abrasive grains bonded together in a three-dimensional structure by a substantially continuous, non-porous inorganic binder, wherein the abrasive grains have an average size of between about 0.5 microns and about 1500 microns, the inorganic binder comprises less than about 75 percent, by weight, of the abrasive agglomerate, and the bulk density of the agglomerate is less than about 90 percent of the bulk density of the abrasive grains.

In another aspect, the present disclosure provides a coated abrasive comprising a backing having a surface, and a plurality of abrasive agglomerates secured to the surface by a bond system, wherein each of the plurality of abrasive agglomerates include a plurality of abrasive grains bonded together in a three-dimensional structure by a substantially continuous, non-porous inorganic binder, wherein the abrasive grains have an average size of between about 0.5 microns and about 1500 microns, the inorganic binder is less than about 75 percent, by weight, of the abrasive agglomerate, and the bulk density of the agglomerate is less than about 90 percent of the bulk density of the abrasive grains.

In another aspect, the present disclosure provides a method of making abrasive agglomerates including the steps of providing a plurality of glass bodies, each glass body having a defined shape, the glass bodies having a softening temperature, providing a plurality of abrasive grains, mixing the plurality of glass bodies with the plurality of grains to form a mixture, heating the mixture to the softening temperature so that the glass bodies soften while substantially retaining the defined shape, adhering abrasive grains to the softened glass bodies to form a plurality of abrasive agglomerates, and cooling the abrasive agglomerates so that the glass bodies harden.

The abrasive agglomerates of the present disclosure are generally inexpensive to manufacture and typically provide improved grinding life.

DETAILED DESCRIPTION

Figure 1:
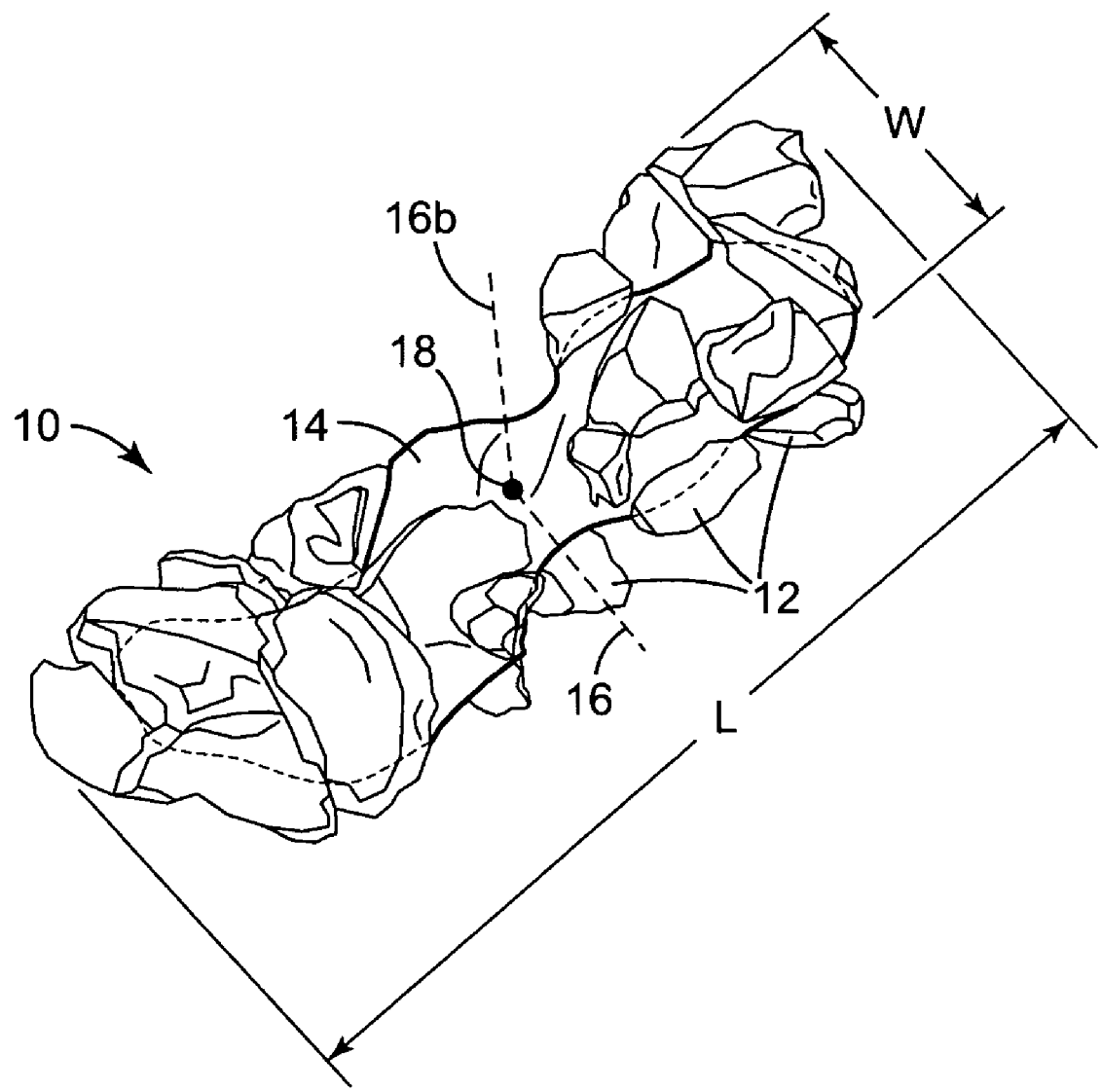
FIG. 1 is a perspective view of a representative abrasive agglomerate according to the present disclosure.
Figure 2:
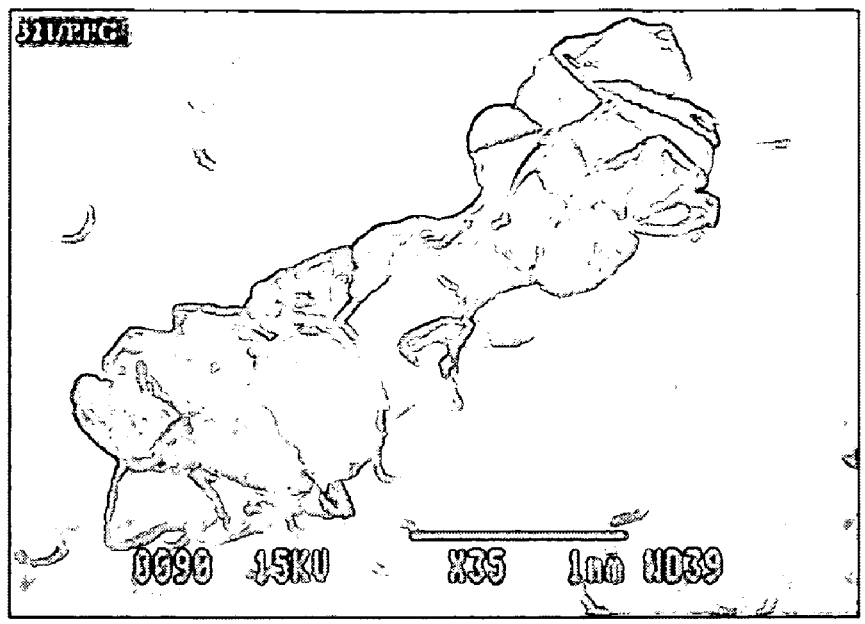
FIG. 2 is a photomicrograph of an abrasive agglomerate according to the present disclosure, wherein the glass binder is made from a fibrous glass body.
Figure 3:
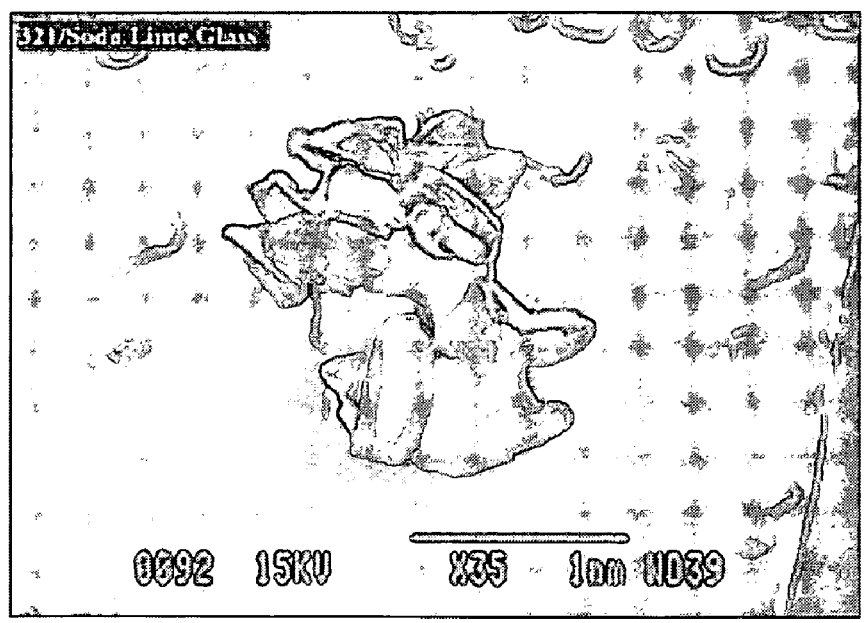
FIG. 3 is a photomicrograph of an abrasive agglomerate according to the present disclosure, wherein the glass binder is made from a glass body of post-consumer recycled glass.

Turning to FIG. 1, an abrasive agglomerate according to the present disclosure comprises a plurality of abrasive grains bonded together in a three-dimensional structure by a substantially continuous, non-porous inorganic binder 14, wherein abrasive grains have an average size between about 0.5 microns and about 1500 microns, inorganic binder 14 is less than about 75 percent, by weight, of abrasive agglomerate, and the bulk density of abrasive agglomerate is less than about 90 percent of the bulk density of abrasive grains. Here, "bulk density" refers to the volume of a bulk amount of particles, i.e., abrasive grains or abrasive agglomerates, when the particles are loosely packed.

In some embodiments, the inorganic binder is a glass binder formed from inexpensive raw material such as glass bodies made from chopped fiberglass strands, fiberglass insulation, post-consumer recycled glass, or sized glass frit particles. As described below, the method of the present invention provides for the manufacture of inexpensive abrasive agglomerate abrasive grains using inexpensive raw materials to act as a binder for the formation of the abrasive agglomerates.

By substantially continuous and non-porous it is meant that the glass binder is formed of a single non-porous body of glass. In the three-dimensional structure of the abrasive agglomerate the glass binder is substantially uninterrupted throughout the three-dimensional structure. The glass binder generally wets the abrasive grains without the formation of gaps or air pores. In some embodiments, the glass binder is formed from a single non-porous body of glass. In some embodiments, the abrasive agglomerate has the same general shape as the body of glass used to form the glass binder.

In some embodiments, the abrasive agglomerate has a size between about 5 microns and about 10,000 microns. In some embodiments, the abrasive agglomerate has a size between about 10 microns and about 100 microns. In yet further embodiments, the abrasive agglomerate has a size of about 15 microns. By "size" of the abrasive agglomerate it is meant the smallest linear dimension of the abrasive agglomerate. For example, the size of the abrasive agglomerate shown in FIG. 1 is the dimension W. In another embodiment, abrasive agglomerates have an aspect ratio of greater than 1:1. In some embodiments, abrasive agglomerates have an aspect ratio of between about 1:1 and about 20:1. In yet further embodiments, abrasive agglomerates have an aspect ratio between about 2:1 and about 5:1. By "aspect ratio" it is meant the ratio between the longest dimension and the narrowest dimension of the abrasive agglomerate. For example, in FIG. 1, the longest dimension of the abrasive agglomerate is length L and the shortest dimension is width W, so that the aspect ratio of the abrasive agglomerate in FIG. 1 is L:W (shown as about 3:1 in FIG. 1).

For each abrasive agglomerate, there should be a sufficient number of abrasive grains so that an abrasive article made from abrasive agglomerates will have an acceptable cutting life without having more abrasive grains than are necessary for efficient grinding. In some embodiments, there are between about 3 and about 300 abrasive grains per abrasive agglomerate. In some embodiments, there are about 3 and about 20 abrasive grains per abrasive agglomerate. In yet further embodiments, there are between about 3 and about 15 abrasive grains per abrasive agglomerate. In some embodiments, there is between about 0.05 grams and about 0.5 grams of the glass binder per gram of the abrasive grains. In some embodiments, there are between about 0.1 grams and about 0.45 grams of the glass binder per gram of the abrasive grains. In yet further embodiments, there are between about 0.15 grams and about 0.25 grams of the glass binder per gram of abrasive grains in the abrasive agglomerates.

Figure 8:
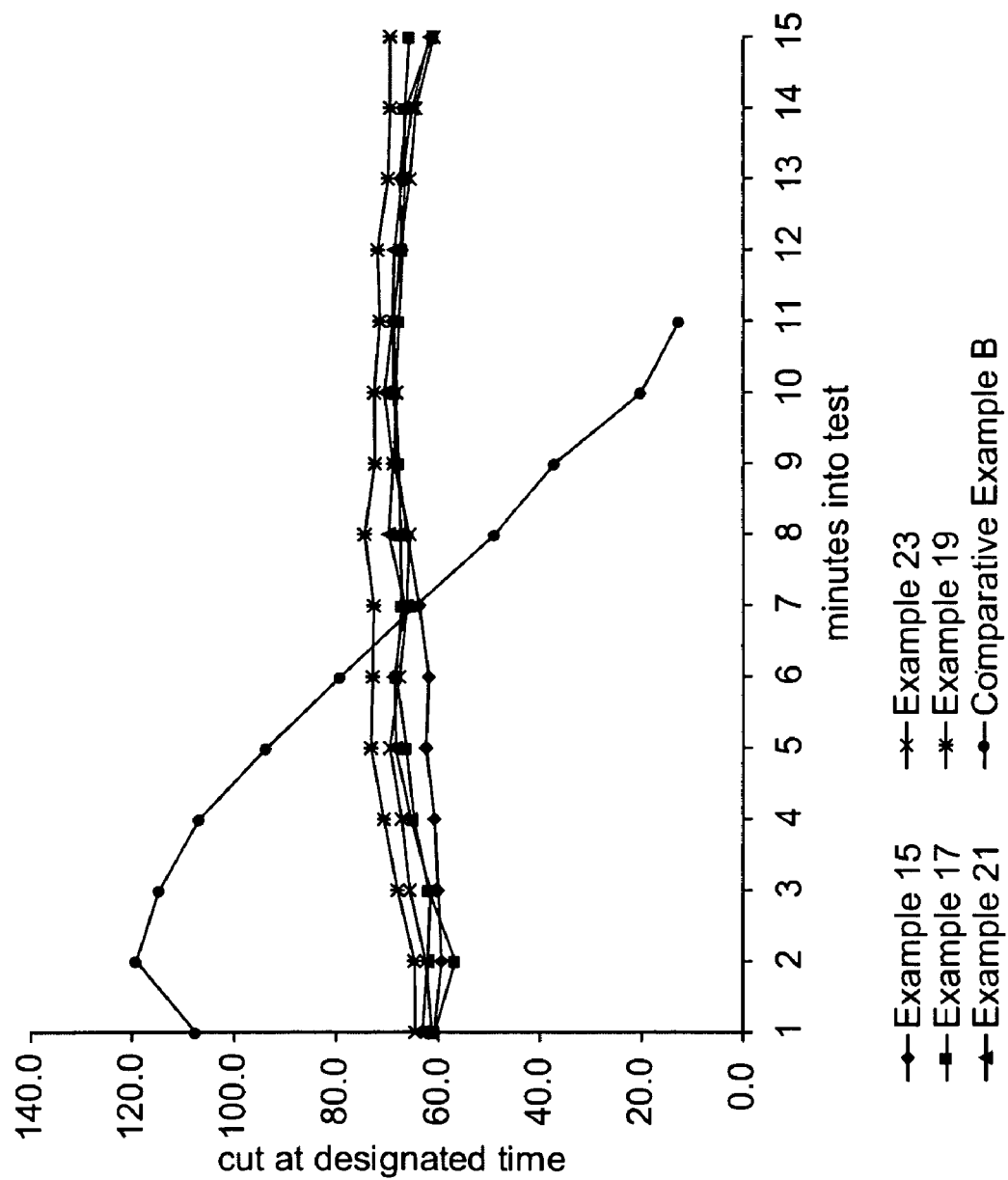
FIGS. 8 and 9 are line graphs showing the grinding results of a coated abrasive disc made with various abrasive agglomerates made according to the present disclosure compared with a coated abrasive disc made with conventional abrasive grains.
Figure 9:
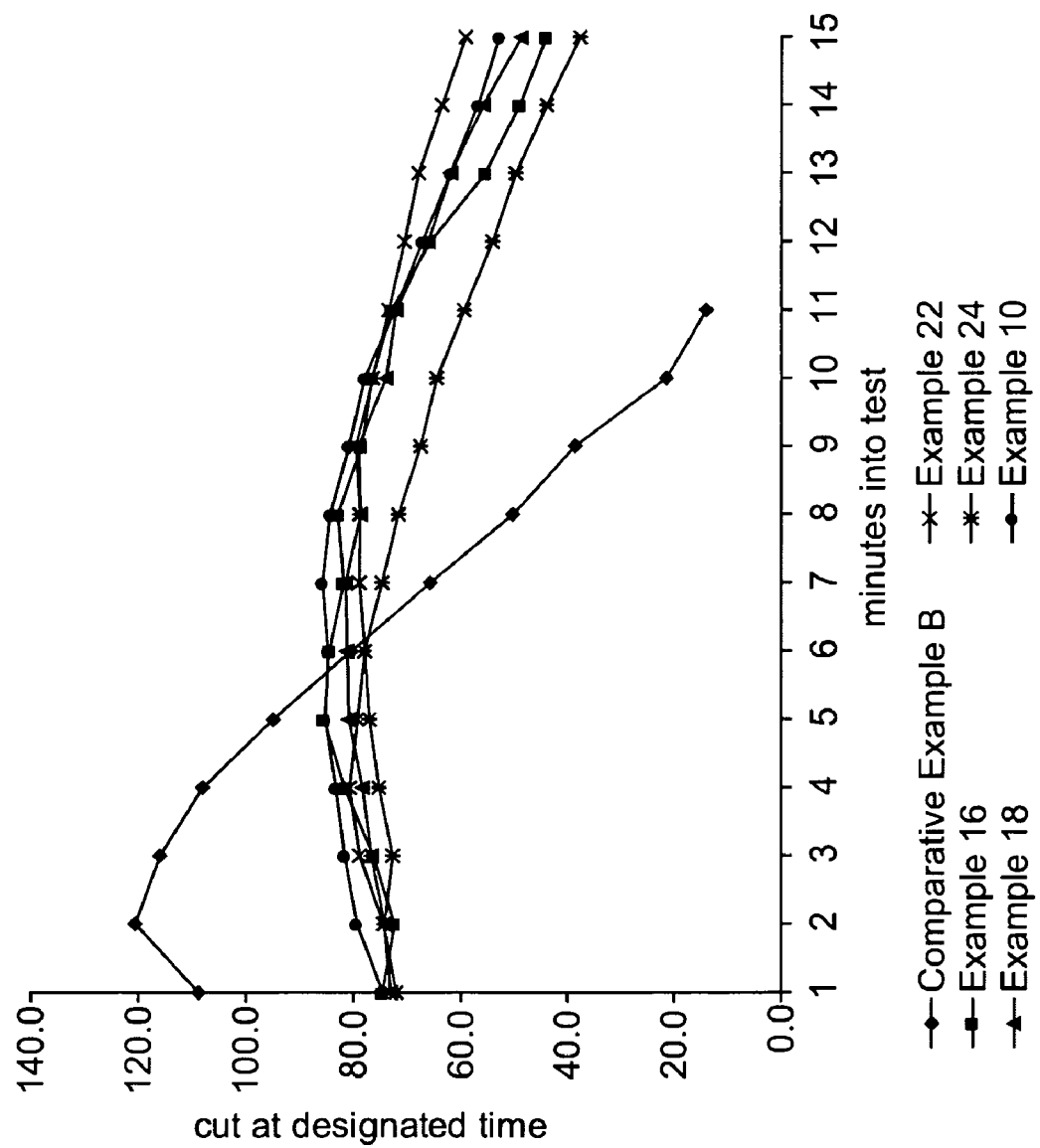

Abrasive agglomerates of the present disclosure have been shown to substantially increase the grinding life of an abrasive article that employs abrasive agglomerates rather than conventional abrasive grains. See, for example, the comparison between the grinding discs of Comparative Example B (traditional abrasive grains) and Example 15 (abrasive agglomerate of the present invention). The grinding disc made with abrasive agglomerates of the present invention were able to grind a total of 289 grams off a 1018 steel workpiece over an 8 minute period, while a traditional grinding disc was only able to grind a total of about 260 grams over the same period. Also, in another comparison test, the conventional grinding disc was only able to grind for about 11 minutes, while a grinding disc made with abrasive agglomerates was still grinding effectively after 15 minutes (see FIG. 8).

In some embodiments, abrasive grains are not substantially encapsulated by an inorganic binder. In this context, the phrase "not substantially encapsulated" means that a portion of the surface of the abrasive grain is not in contact with the glass binder. In some embodiments, a majority of each abrasive grain is exposed so that it is not encapsulated within the glass binder. In another embodiment, abrasive grains form a discontinuous coating on the glass binder, wherein a straight line, such as straight line 16 shown in FIG. 1, extending radially outwardly from the center of the glass binder passes through no more than three abrasive grains. In some embodiments, abrasive grains form a discontinuous coating on the glass binder, wherein a straight line, such as a straight line shown in FIG. 1, extending radially outwardly from the center of the glass binder passes through no more than two abrasive grains. In some embodiments, abrasive grains form a discontinuous monolayer on the glass binder so that the line extending radially outwardly from the agglomerate center passes through no more than one abrasive grain. Because the abrasive grains form a discontinuous coating, it is possible that the line extending outwardly from the agglomerate center may not extend through any abrasive grains, such as line 16*b* shown in FIG. 1.

Abrasive grains useful in the abrasive agglomerate of the present disclosure are selected to achieve a desired cut rate and surface finish to be produced by the abrasive article. Abrasive grains typically have a particle size ranging from about 0.5 micrometers to about 1500 micrometers. In some embodiments, the abrasive grain particle size is between about 1 micrometer and about 1300 micrometers, where "size" of abrasive grain refers to the shortest dimension of an individual particulate abrasive grain.

Examples of suitable abrasive grains for use in abrasive agglomerates of the present disclosure include particles made from fused aluminum oxide, ceramic aluminum oxide, heat treated aluminum oxide, white fused aluminum oxide, brown fused aluminum oxide, monocrystalline fused aluminum oxide, silica, silicon carbide, green silicon carbide, boron carbide, titanium carbide, alumina zirconia, fused alumina zirconia, diamond, ceria, cubic boron nitride (CBN), boron oxides in the form of $B_6O$ and $B_{10}O$, garnet, tripoli, boron carbonitride, sintered alpha alumina-based abrasive particles, boehmite-derived, sintered alumina, and combinations thereof. In one embodiment, abrasive grains are grains sold under the trade designation "CUBITRON" by 3M Company (St. Paul, Minn.).

In some embodiments, abrasive grains are or substantially comprise "superabrasive" materials having a hardness of at least about 35 GPa. In some embodiments, abrasive grains are or substantially comprise "superabrasive" materials having a hardness at least about 40 GPa, such as diamond, CBN, or combinations thereof. In this context, substantially comprise superabrasive materials is used to described embodiments where the abrasive grains are at least 30 percent superabrasive grains. In some embodiments, the abrasive grains are at least 50 percent superabrasive grains. In yet further embodiments, the abrasive grains are at least about 75 percent superabrasive grains.

In one embodiment, the glass binder is a substantially continuous, non-porous vitreous substance, which binds abrasive grains together to form the abrasive agglomerate. The glass binder should be strong enough to hold the abrasive grains in place when the abrasive agglomerates are being used to abrade a workpiece, yet friable enough to break when an abrasive grain becomes too polished or dull to effectively cut the workpiece. The glass binder is typically less than about 75 percent by weight of the abrasive agglomerate. In some embodiments, the glass binder is less than about 60 percent by weight of the abrasive agglomerate. In yet further embodiments, the glass binder is less than 50 percent by weight of the abrasive agglomerate. Use of the term "the glass binder" is not intended to limit the glass binder solely to strictly glassy, non-crystallized substances. Rather, the glass binder may be a partially or fully crystallized material in the finished abrasive agglomerate. In one embodiment, the glass binder is made from glass bodies which start as glass, but which are partially or completely crystallized during the heating and cooling process of making the abrasive agglomerates.

Examples of materials that may be used for the glass binder include silicates, soda lime silicates, calcium silicates, calcium alumino silicates, sodium silicate, potassium silicates, borosilicates, phosphates, boron glasses, aluminates, glass ceramics, titanate containing glasses, rare earth oxide glasses, zirconia based glasses, cullet and crushed post consumer recycled glass or combinations thereof. The glass binder may be partially or fully crystallized in the abrasive agglomerate.

In some embodiments, the glass binder is formed from glass bodies, which can be obtained as inexpensive raw materials for use in forming the abrasive agglomerates. Examples of glass body raw materials include chopped fiberglass strand available from Owens Corning (Toledo, Ohio) or from Saint-Gobain Vetrotex America, Inc. (Valley Forge, Pa.), fiberglass insulation batting available from Johns Manville Corporation (Denver, Colo.), recycled glass fines available from American Specialty Glass Inc. (North Salt Lake City, Utah), or glass frit pieces available from Ferro Corporation (Cleveland, Ohio). In one embodiment, glass bodies are glass fibers that may be bundled together before mixing with abrasive grains. In some embodiments, the glass bodies are at least about 2 times larger than the abrasive grains. In some embodiments, the glass bodies are at least about 3 times larger. In yet further embodiments, the glass bodies are at least about 5 times larger than abrasive grains. In this context, the term "larger" is meant that the longest dimension of glass body, i.e. length L in FIG. 1, is greater than the size of abrasive grains.

A method of making a plurality of abrasive agglomerates includes the steps of providing a plurality of glass bodies made from the glass binder, each glass body having a defined shape, and glass bodies having a softening temperature, providing a plurality of abrasive grains, mixing the plurality of glass bodies and the plurality of abrasive grains together to form a mixture, heating the mixture to the softening temperature of glass bodies so that glass bodies soften while substantially retaining the defined shape, adhering abrasive grains to the softened glass bodies to form a plurality of abrasive agglomerates, and cooling abrasive agglomerates so that the glass binder of glass bodies hardens.

In some embodiments, glass bodies are provided as inexpensive precursors: such as chopped fiberglass strand; a plurality of glass fibers, or particles of post-consumer recycled glass. Such glass bodies have an initial shape, which is conducive to the formation of abrasive agglomerates. In some embodiments, the glass bodies are long, thin chopped fiberglass strands, such as the fiberglass strand sold by Owens Corning, having a length of between about $1/32$ inch and about $3/8$ inch. In some embodiments, the glass bodies have a length of about $1/16$ inch. In some embodiments, the width of the glass bodies is between about $1/64$ inch and about $1/16$ inch. In some embodiments, the width of the glass bodies is about $1/32$ inch. In other embodiments, the glass bodies are post-consumer recycled glass fines having a size of between about $1/128$ inch and about $1/16$ inch. In some embodiments, the recycled glass fines can be between about $1/64$ inch and about $1/32$ inch. In yet further embodiments, recycled glass fines having a size of about $1/64$ inch can be used.

After glass bodies have been selected, the glass bodies are mixed with a plurality of abrasive grains. In some embodiments, excess abrasive grains are mixed with the glass bodies during the mixing step. By "excess" it is meant that more abrasive grains are mixed with the glass bodies than are needed for the formation of abrasive agglomerates. In one embodiment, the mixing step includes providing an excess of abrasive grains of at least about 2 parts abrasive grains per part glass bodies, by volume. In yet further embodiments, the mixing step includes providing an excess of abrasive grains of at least about 3 parts abrasive grains per part glass bodies, by volume. In yet still further embodiments, the mixing step includes providing an excess of abrasive grains of at least about 4 parts abrasive grains per part glass bodies, by volume. In another method, between about 2 parts and about 200 parts of abrasive grains, by weight, are provided per part glass bodies. In further embodiments, between about 10 parts and about 100 parts abrasive grain per part glass bodies, by weight, are provided per part glass bodies. In yet still further embodiments, between about 10 parts and about 25 parts abrasive grain per part glass bodies, by weight, are provided per part glass bodies. The mixture of glass bodies and abrasive grains is mixed together, i.e. using conventional mixing means such as a commercial mixer, until there is a substantially uniform distribution of glass bodies within abrasive grains.

In some embodiments, the mixing step includes mixing water, or some other temporary liquid binder, with glass bodies and abrasive grains so that abrasive grains and glass bodies remain uniformly mixed. In some embodiments, between about 1 gram and about 5 grams are added per 100 grams of abrasive grains. In some embodiments, between about 2 grams and about 4 grams are added per 100 grams of abrasive grains. In yet further embodiments, about 3 grams of water were added per 100 grams of abrasive grains.

After being mixed, the mixture is heated to the softening temperature of the glass binder of glass bodies. The mixture may be heated using any one of a number of heating devices, including furnaces and kilns. In a preferred method, the mixture is continually fed to a rotary kiln or a vertical shaft kiln while formed abrasive agglomerates are removed from the kiln.

The mixture is heated to at least the softening temperature of the glass binder so that glass bodies soften allowing abrasive grains to adhere to glass bodies. By "softening temperature" it is meant the temperature at which the viscosity of the glass binder becomes low enough for the glass binder to be sufficiently deformable so that abrasive grains may be embedded in the glass binder. Although glass bodies may show some distortion, fusion or flow after agglomeration when compared to their initial raw material state, the shape of each glass body substantially retains its bulk shape and remains approximately intact forming the backbone of abrasive agglomerate.

The softening temperature of a particular the glass binder depends on the composition of the glass binder. For example, a chopped strand fiberglass available from St. Gobain (Valley Forge, Pa.) is made from "E Glass" having a composition of 52-62 percent silica ($SiO_2$), 16-30 percent terrous oxides (i.e. CaO or MgO), 0-10 percent $B_2O_3$, 11-16 percent $Al_2O_3$ and small amounts (i.e. nor more than 3 percent) of alkaline oxides (i.e. $Na_2O$ or $K_2O$), $TiO_2$, $Fe_2O_3$, and $F_2$ has a softening temperature of about 1000° C., while post-consumer recycled glass has a different composition and has a lower softening temperature of about 800° C. The softening temperature of a particular glass binder can readily be determined by one having ordinary skill in the art by trial and error, wherein the mixture of glass bodies and abrasive grains are heated to an experimental temperature, and the resulting abrasive agglomerates are analyzed to determine if the glass binder has softened sufficiently so that it flows adequately to wet abrasive grains such that the abrasive grains will be sufficiently bound to glass bodies. In one method, the softening temperature is determined to be the temperature wherein the glass bodies become soft enough so that at least about 5 percent of the abrasive grain is embedded in the glass binder for a majority of the abrasive grains. In some embodiments, the softening temperature is determined to be the temperature wherein glass bodies become soft enough so that at least about 10 percent of the abrasive grain is embedded in the glass binder for a majority of the abrasive grains. In yet further embodiments, the softening temperature is determined to be the temperature wherein glass bodies become soft enough so that at least about 20 percent of the abrasive grain is embedded in the glass binder for a majority of the abrasive grains. In one method, the mixture is heated to a temperature of between about 300° C. and about 1500° C. In some embodiments, the mixture is heated to a temperature between about 400° C. and about 1100° C. In further embodiments, the mixture is heated to a temperature between about 600° C. and 1000° C.

The heating step may also include heating the mixture of glass bodies and abrasive grains above the softening temperature of the glass binder so that the glass binder flows slightly and wets the surfaces of abrasive grains. In some embodiments, the mixture is heated to between about 1° C. and about 200° C. above the softening temperature of the glass binder. In some embodiments, the mixture is heated to between about 5° C. and about 50° C. above the softening temperature of the glass binder. In yet further embodiments, the mixture is heated to about 10° C. above the softening temperature of the glass binder. The mixture is heated to a temperature that is well below the melting temperature of abrasive grains so that abrasive grains retain their size and shape, and also so that abrasive grains do not melt or adhere to each other.

Glass bodies and abrasive grains are heated for a period of time that is sufficient to ensure that a defined desired number of abrasive grains are bound to each glass body. The amount of time in which the mixture is heated should not be too long however, as that would require more energy than is necessary for the formation of abrasive agglomerates. In some embodiments, the glass bodies and abrasive grains are heated for between about ½ hour and about 4 hours. In some embodiments, the glass bodies and abrasive grains are heated for between about 1 hour and about 3 hours. In yet further embodiments, glass bodies and abrasive grains are heated for about 2 hours. However, the amount of time in which the mixture of glass bodies and abrasive grains are heated depends on the temperature to which the mixture is to be heated and the composition of the glass binder. If a rotary kiln is used to heat the mixture, as describe below, the kiln is designed so that the residence time within the heated portion of the rotary kiln produces the desired heating time of the mixture. In a rotary kiln, the heating time may also be much shorter. In some embodiments, the heating time within a rotary kiln is less than one hour. In some embodiments, the heating time within a rotary kiln is between about 5 and about 15 minutes.

In some embodiments, a rotary kiln is used to heat the mixture of the glass binder and abrasive grains. In one embodiment, the rotary kiln includes a long metal, cylindrical tube and a heating element to heat the tube and its contents. The rotary kiln tube can be, for example, an Inconel tube having an outer diameter of about 5 inches, and inner diameter of about 4½ inches, and a heated length of about 48 inches. The rotary kiln may be a 2 zoned kiln heated with silicone carbide resistance heating elements. In some embodiments, the rotary kiln is angled slightly from horizontal so that abrasive grains, the glass binder made from glass bodies, and formed abrasive agglomerates pour down the rotary kiln during operation. In one embodiment, the tube of the rotary kiln is angled from horizontal between about 2 degrees and about 30 degrees. In some embodiments, the tube of the rotary kiln is angled from horizontal between about 5 and about 20 degrees from horizontal. The rotary kiln is rotated to keep the components mixed within the kiln during heating. In one method, the rotary kiln is rotated between about 1 and about 10 rotations per minute. In some embodiments, the rotary kiln is rotated between about 2 and about 8 rotations per minute. The rotary kiln may also include a weight, which strikes the tube at regular intervals to prevent material from building up on the interior walls of the rotary kiln. The rotary kiln may also include a scraper blade within the interior of the rotary kiln for the same purpose.

After the glass binder has been sufficiently softened, abrasive grains adhere to glass bodies to form heated, abrasive agglomerates. Abrasive grains that are bound to glass bodies are, in some embodiments, partially embedded in the glass binder so that a significant portion of each abrasive grain 12 is exposed, as shown in FIG. 1.

After heating and adhering abrasive grains to the glass binder, abrasive agglomerates are cooled so that the glass binder hardens and abrasive grains are held in place to form abrasive agglomerates. Abrasive agglomerates are cooled to a temperature that is sufficiently low for the glass binder to harden into a solid or substantially solid state to inhibit removal of abrasive grains from abrasive agglomerate. After glass bodies have cooled and hardened, abrasive grains are bonded onto the outside surfaces of glass bodies. In one embodiment, abrasive agglomerates are cooled to between about 20° C. and about 100° C. In some embodiments, abrasive agglomerates are cooled to between about 25° C. and about 75° C. In yet further embodiments, abrasive agglomerates are cooled to "room temperature," or about 25° C. Cooling may be achieved by removing the formed abrasive agglomerate precursors from the furnace or kiln and allowing them to "air cool," or the abrasive agglomerate precursors may be cooled by active cooling, such as with a water cooling system which cools a portion of the rotary kiln. After the cooling step, glass bodies are, in some embodiments, substantially continuous and non-porous.

In another embodiment, a step of heat-treating abrasive agglomerates to crystallize all or part of the glass binder may be included. The heat-treating step may be employed either before or after abrasive agglomerates have been fully cooled.

As described above, in some embodiments glass bodies used to make abrasive agglomerates are mixed with an excess of abrasive grains so that each glass body is sufficiently covered with abrasive grains. Therefore, in one method, a step of separating abrasive agglomerates from the excess abrasive grains is included. One separating step includes selecting a mesh screen with openings smaller than abrasive agglomerates, yet larger than abrasive grains, and sifting abrasive agglomerates from the excess abrasive grains using the mesh screen. Because abrasive agglomerates may form with different sizes, in some embodiments a series of mesh screens is employed, each being successively smaller, to first catch large abrasive agglomerates, then smaller abrasive agglomerates, while still sifting out the excess abrasive grains.

Abrasive agglomerates may have a particle size that is desired for employment in a particular abrasive article. However, in some methods, some of glass bodies may be larger than the desired agglomerate size, or two or more glass bodies may stick together during the heating step so that some of the abrasive agglomerates may be larger than desired. Therefore, in one method, a step of breaking the formed abrasive agglomerates into smaller sizes is included. The breaking step may include crushing the abrasive agglomerates under rollers or some other breaking means followed by sifting of abrasive agglomerates using screens to remove abrasive agglomerates, which are of the desired size so that abrasive agglomerates, which are still too large may be broken up again. In one embodiment, the final abrasive agglomerates have a size between about 5 microns and about 10,000 microns.

Figure 5:
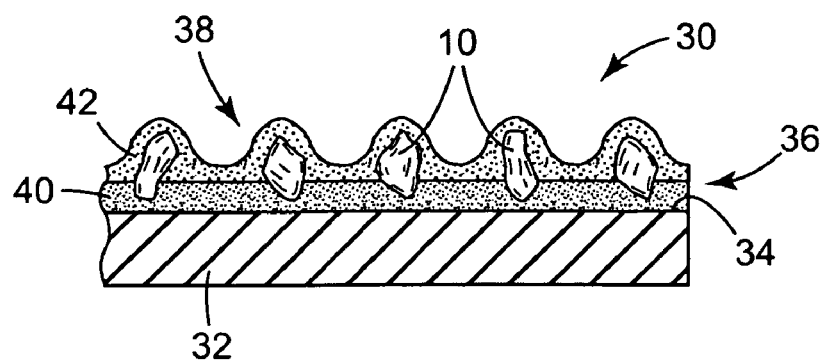
FIG. 5 is a cross-sectional schematic view of a coated abrasive article made with the abrasive agglomerates of the present disclosure.
Figure 6:
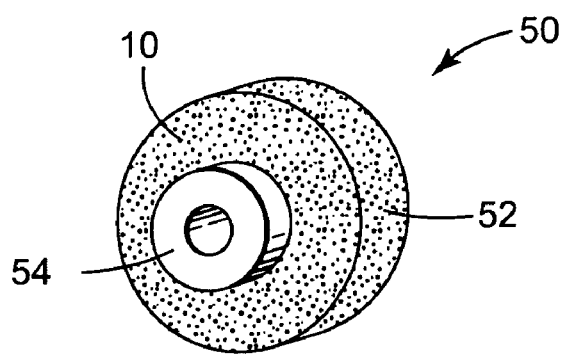
FIG. 6 is a perspective view of a bonded abrasive article made with the abrasive agglomerates of the present disclosure.
Figure 7:
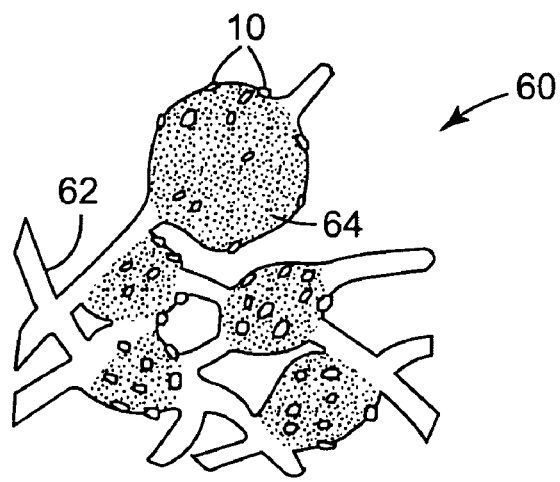
FIG. 7 is an enlarged schematic view of non-woven abrasive article made with the abrasive agglomerates of the present disclosure.

Abrasive agglomerates of the present invention may be used in the manufacture of several kinds of abrasive articles, such as a coated abrasive article 30, shown in FIG. 5, bonded abrasives, such as the grinding wheel 50 shown in FIG. 6, and a non-woven abrasive article 60, as shown in FIG. 7, and abrasive brushes.

Turning to FIG. 5, a coated abrasive article 30 is shown having a backing 32 with a major surface 34, and a plurality of abrasive agglomerates 10 secured to major surface 34 by a bond system 36, wherein each abrasive agglomerate 10 includes a plurality of abrasive grains bonded together in a three-dimensional structure by a substantially continuous, non-porous inorganic binder, wherein the abrasive grains have an average size of between about 0.5 microns and about 1500 microns, the inorganic binder is less than about 75 percent, by weight, of abrasive agglomerate 10, and the bulk density of abrasive agglomerate 10 is less than about 90 percent of the bulk density of the abrasive grains.

Bond system 36 binds abrasive agglomerates 10 to major surface 34 of backing 32 to form an abrasive layer 38. As is generally known in the art, bond system 36 may comprise a make layer 40 and a size layer 42, wherein make layer 40 is applied to major surface 34 and a portion of each abrasive agglomerate 10 is imbedded in make layer 40. Size layer 42 is applied over make layer 40 and abrasive agglomerates 10 to reinforce the adhesion of abrasive agglomerates 10 to backing 32. A supersize layer (not shown) may also be used.

Backing may be one of many types of backing known in the art of coated abrasives wherein abrasive layer is coated on a major surface of backing. Examples of typical backing material include polymeric film, primed polymeric film, greige cloth, cloth, fiber, paper, vulcanized fiber, nonwovens, polymer/fiber composites and treated versions and/or combinations thereof. A preferred backing is made from cloth, such as a cloth backing described in U.S. Pat. No. 5,975,988 (Christianson), the disclosure of which is incorporated herein by reference; or a fiber backing, such as a fiber backing described in U.S. Patent Publication 2005/0032468 (Hunt et al.), the disclosure of which is incorporated herein by reference.

Bond system is in some embodiments an organic-based bond system which may comprise, for example, at least two adhesive layers, the first of which being make layer and the second being size layer. Typically, make layer and size layer are formed from organic-based binder precursors, for example, resins. Precursors used to form make layer may be the same or different from those used to form size layer. Upon exposure to the proper conditions, such as heat or an ultraviolet energy source, the resin polymerizes to form a cross-linked thermoset polymer or binder. Examples of typical resins used to form bond system include phenolic resins, aminoplast resins having pendant alpha, beta, unsaturated carbonyl groups, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, fluorine modified epoxy resins, and mixtures thereof. Epoxy and phenolic resins are preferred. Examples of commercially available phenolic resins include those known by the trade names DUREZ and VACRUM available from Occidental Chemicals Corp., RESINOX available from Monsanto, and AROFENE and AROTAP available from Ashland Chemical Co.

Aminoplast resins typically have at least one pendant alpha, beta-unsaturated carbonyl group per molecule or oligomer. Useful aminoplast resins include those described in U.S. Pat. No. 4,903,440 (Larson et al.) and U.S. Pat. No. 5,236,472 (Kirk et al.), which are incorporated herein by reference.

Epoxy resins have an oxirane ring and are polymerized by the ring opening. Suitable epoxy resins include monomeric epoxy resins and polymeric epoxy resins and can have varying backbones and substituent groups. In general, the backbone may be of any type normally associated with epoxy resins, for example, Bis-phenol A, and the substituent groups can include any group free of an active hydrogen atom that is reactive with an oxirane ring at room temperature. Representative examples of suitable substituent groups include halogens, ester groups, ether groups, sulfonate groups, siloxane groups, nitro groups and phosphate groups.

Examples of preferred epoxy resins include 2,2-bis[4-(2,3-epoxypropoxy)-phenyl]propane (a diglycidyl ether of bisphenol) and commercially available materials under the trade designation "Epon 828", "Epon 04", and "Epon 01F" available from Shell Chemical Co., and "DER-331", "DER-332" and "DER-334" available from Dow Chemical Co. Other suitable epoxy resins include glycidyl ethers of phenol formaldehyde novolac, for example, "DEN431" and "DEN428" available from Dow Chemical Co.

Ethylenically unsaturated resins include both monomeric and polymeric compounds that contain atoms of carbon, hydrogen, and oxygen, and optionally, nitrogen and halogen atoms. Oxygen or nitrogen atoms or both are generally present in ether, ester, urethane, amide, and urea groups. Ethylenically unsaturated compounds, in some embodiments, have a molecular weight of less than about 4,000, and are, in some embodiments, esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, and maleic acid.

Representative examples of acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol trimethocyate, pentaerythritol tetraacrylate and pentaerythritol tetramethocylate.

Other ethylenically unsaturated resins include monoallyl, polyallyl, and polymethallyl esters and amides of carboxylic acids, such as diallyl phthalate, diallyl adipate, and N,N-diallyladipamide. Other suitable nitrogen-containing compounds include tris(2-acryloyl-oxyethyl)isocyanurate, 1,3,5-tri(2-methacryloxyethyl)-s-triazine, acrylamide, methylacrylamide, N-methylacrylamide, N,N-dimethylacrylamide, N-vinylpyrrolidone, and N-vinylpiperidone.

Acrylated urethanes are diacrylate esters of hydroxy terminated NCO extended polyesters or polyethers. Examples of commercially available acrylated urethanes include "UVITHANE 782", available from Morton Thiokol Chemical, and "CMD 6600," "CMD 8400," and "CMD 8805," available from Radcure Specialties.

Acrylated epoxies are diacrylate esters of epoxy resins, such as the diacrylate esters of bisphenol A epoxy resin. Examples of commercially available acrylated epoxies include "CMD 3500," "UCMD 3600," and "CMD 3700," available from Radcure Specialties.

Bond system 36, for example, the make layer 40 and/or size layer 42, of this invention can further comprise optional additives, such as, for example, fillers (including grinding aids), fibers, antistatic agents, lubricants, wetting agents, surfactants, pigments, dyes, coupling agents, plasticizers, and suspending agents. The amounts of these materials can be selected to provide the properties desired.

Examples of useful fillers for this invention include metal carbonates (such as calcium carbonate (e.g., chalk, calcite, marl, travertine, marble, and limestone), calcium magnesium carbonate, sodium carbonate, and magnesium carbonate); silica (such as quartz, fumed silica, glass beads, glass bubbles, and glass fibers); silicates (such as talc, clays (e.g., montmorillonite) feldspar, mica, calcium silicate, calcium metasilicate, sodium aluminosilicate, sodium silicate); metal sulfates (such as calcium sulfate, barium sulfate, sodium sulfate, aluminum sodium sulfate, aluminum sulfate); gypsum; vermiculite; wood flour; aluminum trihydrate; carbon black; metal oxides (such as calcium oxide (lime), aluminum oxide (alumina), and titanium dioxide); and metal sulfites (such as calcium sulfite). The filler typically has an average particle size ranging from about 0.1 to 100 micrometers. In some embodiments, the filler has an average particle size ranging from between 1 to 50 micrometers. In yet further embodiments, the filler has an average particle size ranging from between 1 and 25 micrometers.

Suitable grinding aids include particulate material, the addition of which has a significant effect on the chemical and physical processes of abrading which results in improved performance. In particular, a grinding aid may 1) decrease the friction between the abrasive grains and the workpiece being abraded, 2) prevent the abrasive grain from "capping", i.e. prevent metal particles from becoming welded to the tops of the abrasive grains, 3) decrease the interface temperature between the abrasive grains the workpiece and/or 4) decrease the grinding forces. In general, the addition of a grinding aid increases the useful life of the coated abrasive. Grinding aids encompass a wide variety of different materials and can be inorganic- or organic-based.

Examples of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Examples of other grinding aids include sulfur, organic sulfur compounds, graphite, and metallic sulfides. A combination of different grinding aids can be used, for example, as described in WO 95/24991 (Gagliardi et al.). The above mentioned examples of grinding aids are meant to be a representative showing of grinding aids and are not meant to encompass all grinding aids.

Examples of antistatic agents include graphite, carbon black, vanadium oxide, humectants, and the like. These antistatic agents are disclosed in U.S. Pat. No. 5,061,294 (Harmer et al.); U.S. Pat. No. 5,137,542 (Buchanan et al.); and U.S. Pat. No. 5,203,884 (Buchanan et al.) incorporated herein by reference.

Bond system, including make layer and size layer, generally has a Knoop hardness number (KHN) of least 50 KHN (which can also be expressed in units of $Kgf/mm^2$), typically at least about 60 KHN. In some embodiments, bond system, including make layer and size layer, generally has a Knoop hardness number (KHN) of least 50 KHN, typically at least about 70 KHN. In yet further embodiments, bond system, including make layer and size layer, generally has a Knoop hardness number (KHN) of least 50 KHN, typically at least about 80 KHN. In still yet further embodiments, bond system, including make layer and size layer, generally has a Knoop hardness number (KHN) of least 50 KHN, typically at least about 90 KHN, measured in accordance with ASTM E384-89, in order to be able to withstand grinding forces and not disintegrate.

Generally, if bond system comprises make and size layers, at least one of the make and size layers can comprise from about 5 to 95 parts by weight, in some embodiments 30 to 70 parts by weight, of a binder precursor, for example, a thermoset resin, and between about 5 to 95 parts by weight, in some embodiments, 30 to 70 parts by weight, of a filler. If bond system comprises an abrasive slurry, the amount of binder precursor can range from 5 to 95 weight percent and the amount of filler can range from 5 to 95 weight percent, based on the weight of the abrasive slurry.

For example, the preferred Knoop hardness number ranges for bond system, i.e., in some embodiments, at least 70 KHN. In yet further embodiments, the preferred Knoop hardness number ranges for bond system, i.e., at least 80 KHN. In still yet further embodiments, the preferred Knoop hardness number ranges for bond system, i.e., at least 90 KHN, can be achieved by the presence of filler particles, which are described above. The filler particles will harden the cured thermoset resin and toughen bond system, for example, the make and size layer. The amount of filler particles and the presence of a coupling agent aid in controlling the Knoop hardness of bond system.

To achieve the preferred Knoop hardness ranges, a coupling agent may be present on the filler and/or the abrasive particles. The coupling agent provides an association bridge between bond system and the filler and/or abrasive particles. Examples of suitable coupling agents include organosilanes, zircoaluminates, and titanates. Coupling agents are usually present in an amount ranging between about 0.1 to 5 percent by weight, in some embodiments, 0.5 to 3.0 percent, based on the total weight of the filler and the abrasive agglomerates.

Abrasive agglomerates may also be used in bonded abrasives. Bonded abrasive articles typically include a shaped mass of abrasive particles (which in practicing the present disclosure includes abrasive grains bonded together by the glass binder to form abrasive agglomerates) held together by a binder, which may be organic, metallic, or vitrified. Such shaped mass can be, for example, in the form of a wheel, such as a grinding wheel, shown in FIG. 6, or cutoff wheel. The diameter of grinding wheels typically is about 1 centimeter to over 1 meter; the diameter of cut off wheels about 1 centimeter to over 80 centimeter, and more typically between about 3 centimeter and about 50 centimeter. The cut off wheel thickness is typically about 0.5 millimeter to about 5 centimeter, more typically between about 0.5 millimeter and about 2 centimeter. The shaped mass can also be in the form, for example, of a honing stone, segment, mounted point, disc (e.g. double disc grinder) or other conventional bonded abrasive shape. Bonded abrasive articles typically comprise about 3-50 percent by volume binder 52, about 30-90 percent by volume abrasive material, up to 50 percent by volume additives (including grinding aids), and up to 70 percent by volume pores, based on the total volume of the bonded abrasive article. Typically, grinding wheels have at least 10 percent or more porosity. For some grinding operations, very high porosity of more than 50 percent is desirable. One example of a bonded abrasive is the grinding wheel 50 shown in FIG. 6. Grinding wheel 50 includes abrasive agglomerates of the present invention, which are molded together in a wheel by a binder 52, wherein the bonded wheel is mounted on a hub 54.

Suitable organic binders used for making bonded abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. Binder 52 and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may allow for thermal curing, radiation curing, or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous binders 52, which exhibit an amorphous structure and are typically hard, are well known in the art. Bonded, vitrified abrasive articles may be in the shape of a wheel, honing stone, mounted pointed or other conventional bonded abrasive shape. A preferred vitrified bonded abrasive article is a grinding wheel.

Examples of metal oxides that are used to form vitreous binders 52 include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous binders 52 can be formed from composition comprising from 10 to 100 percent glass frit, although more typically the composition comprises percent 20 to 80 percent glass frit, or 30 percent to 70 percent glass frit. The remaining portion of the vitreous binder 52 can be a non-frit material. Alternatively, vitreous binder 52 may be derived from a non-frit containing composition. Vitreous binders 52 are typically matured at a temperature(s) in the range from about 700° C. to about 1500° C., usually in the range from about 800° C. to about 1300° C., sometimes in the range from about 900° C. to about 1200° C., or even in the range from about 950° C. to about 1100° C. The actual temperature at which the bond is matured depends, for example, on the particular bond chemistry. Vitrified binder 52 may also be heat treated to cause it to partially or completely crystallize.

Vitrified binders may include those comprising silica, alumina (in some embodiments, at least 10 percent by weight alumina), and boria (in some embodiments, at least 10 percent by weight boria). In most cases the vitrified binder further comprise alkali metal oxide(s) (e.g., $Na_2O$ and $K_2O$) (in some cases at least 10 percent by weight alkali metal oxide(s)).

Binder 52 may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, and titanium dioxide), and metal sulfites (e.g., calcium sulfite). Sulfur or wax based grinding aids may also be added to a bonded wheel by filling the porosity after it is has been formed.

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive material and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Turning to FIG. 7, non-woven abrasive articles of the present disclosure include an open porous lofty polymer filament structure having abrasive agglomerates distributed throughout the structure and adherently bonded therein by an organic binder 64. Examples of filaments include polyester fibers, polyamide fibers, and polyaramid fibers. In FIG. 7, a schematic depiction, enlarged about 100×, of a typical non-woven abrasive article 60 is provided. Such a non-woven abrasive article comprises fibrous mat 62 as a substrate, onto which abrasive agglomerates are adhered by a binder 64. Binder 64 used for non-woven abrasive article 60 may be one of the same organic binders described above for bonded abrasives.

Useful abrasive brushes include those having a plurality of bristles unitary with a backing (see, e.g., U.S. Pat. No. 5,427, 595 (Pihl et al.), U.S. Pat. No. 5,443,906 (Pihl et al.), U.S. Pat. No. 5,679,067 (Johnson et al.), and U.S. Pat. No. 5,903,951 (Ionta et al.)), the disclosure of which is incorporated herein by reference). In some embodiments, such brushes are made by injection molding a mixture of polymer and abrasive particles (which in practicing the present invention includes abrasive grains agglomerated together by the glass binder in the form of abrasive agglomerates according to the present disclosure).

Whether they are coated abrasives, bonded abrasives, non-woven abrasives, or abrasive brushes, the abrasive articles can contain 100 percent abrasive agglomerates according to the present disclosure, or blends of abrasive agglomerates with other abrasive particles (which may also be agglomerated) and/or diluent particles. However, at least about 2 percent by weight, in some embodiments at least about 5 percent by weight, and in yet further embodiments, between about 30 percent and about 100 percent by weight, of the abrasive particles in the abrasive articles are abrasive agglomerates. In some instances, abrasive agglomerates may be blended with other abrasive particles and/or diluent particles at a ratio of between 5 to 75 percent by weight, about 25 to 75 percent by weight, about 40 to 60 percent by weight, or about 50 percent to 50 percent by weight (i.e., in equal amounts by weight). Examples of suitable abrasive particles include, but are not limited to, fused aluminum oxide (including white fused alumina, heat treated aluminum oxide and brown aluminum oxide), silicon carbide, silicon nitride, boron carbide, titanium carbide, diamond, cubic boron nitride, garnet, fused alumina-zirconia, sol-gel-derived abrasive particles, and the like. The sol-gel-derived abrasive particles may be seeded or non-seeded. Likewise, the sol-gel-derived abrasive particles may be randomly shaped or have a shape associated with them, such as a triangle or rod. Examples of sol gel abrasive particles include those described above. Abrasive agglomerate may have the essentially the same size as the diluent particle, or conversely, abrasive agglomerate may be larger or smaller in size than the diluent particle.

Abrasive agglomerates according to the present invention can also be combined with other abrasive agglomerates. The binder of the other abrasive agglomerates may be organic and/or inorganic. Additional details regarding abrasive agglomerates may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), U.S. Pat. No. 5,975,988 (Christianson), U.S. Pat. No. 6,620,214 (McArdle et al.), U.S. Pat. No. 6,790,126 (Wood et al.), and U.S. Pat. No. 6,881,483 (McArdle et al.), the disclosures of which are incorporated herein by reference.

If there is a blend of different types of abrasive agglomerates or a blend of abrasive agglomerates and other abrasive particles, the particle/agglomerate types forming the blend may be of the same size. Alternatively, the particle/agglomerate types may be of different particle sizes.

Examples of suitable diluent particles include marble, gypsum, flint, silica, iron oxide, aluminum silicate, glass (including glass bubbles and glass beads), alumina bubbles, alumina beads and diluent agglomerates.

The abrasive agglomerates of the present disclosure may be uniformly distributed in the abrasive article or concentrated in selected areas or portions of the abrasive article. For example, in a coated abrasive, there may be two layers of abrasive particles/grain, wherein the first layer comprises abrasive particles/grain other than abrasive agglomerates according to the present invention, and the second (outermost) layer comprises abrasive agglomerates. Likewise in a bonded abrasive, there may be two distinct sections of the grinding wheel, wherein the outermost section may comprise abrasive agglomerates according to the present invention, whereas the innermost section does not. Alternatively, abrasive agglomerates may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), U.S. Pat. No. 5,975,988 (Christinason), U.S. Pat. No. 6,620,214 (McArdle et al.), U.S. Pat. No. 6,790, 126 (Wood et al.), and U.S. Pat. No. 6,881,483 (McArdle et al.), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800, 685 (Haynes et al.), U.S. Pat. No. 4,898,597 (Hay et al.), U.S. Pat. No. 4,997,461 (Markhoff-Matheny et al.), U.S. Pat. No. 5,038,453 (Narayanan et al.), U.S. Pat. No. 5,110,332 (Narayanan et al.), and U.S. Pat. No. 5,863,308 (Qi et al.) the disclosures of which are incorporated herein by reference. Further, details regarding vitreous bonded abrasives can be found, for example, in U.S. Pat. No. 4,543,107 (Rue), U.S. Pat. No. 4,898,597 (Hay), U.S. Pat. No. 4,997,461 (Markhoff-Matheny et al.), U.S. Pat. No. 5,094,672 (Giles et al.), U.S. Pat. No. 5,118,326 (Sheldon et al.), U.S. Pat. No. 5,131,926 (Rostoker et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

Methods for abrading with preferred abrasive agglomerates according to the present invention range from snagging (i.e., high pressure high stock removal) to polishing (e.g., polishing medical implants with coated abrasive belts), wherein the latter is typically done with finer grades (e.g., ANSI 220 and finer) of abrasive grains. Abrasive agglomerates may also be used in precision abrading applications, such as grinding camshafts with vitrified bonded wheels. The size of the abrasive agglomerates, and abrasive grains comprising such agglomerates, used for a particular abrading application will be apparent to those skilled in the art.

Abrading with abrasive agglomerates may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive agglomerates may be used to abrade workpieces such as aluminum metal, carbon steels, mild steels, tool steels, stainless steel, hardened steel, titanium, nickel alloys, cobalt alloys, glass, ceramics, wood, wood like materials, paint, painted surfaces, organic coated surfaces and the like. The applied force during abrading typically ranges from about 1 to about 100 kilograms.

Abrasive agglomerates may be also be used in loose form or in a slurry wherein agglomerate abrasive grain is dispersed in liquid medium (e.g., water).

The following examples will further illustrate specific embodiments of the present invention. Those of ordinary skill in the art will recognize that the present invention also includes modifications and alterations of the embodiments set out in the examples and that the illustrative examples do not limit the scope of the claimed invention.

EXAMPLES

Example 1

A small quantity of ¼ inch Fiberglass Chopped Strand (US Composites, Inc., West Palm Beach, Fla.) was mixed with a large excess of grade 50 351 CUBITRON (3M, St. Paul, Minn.) abrasive grain in a porcelain crucible. The crucible with this mix was placed in a muffle oven; heated to 1100° C. and held there for 1 hour before the furnace was turned off and allowed to cool. By passing the contents through a 14 mesh screen the agglomerates were recovered from the excess abrasive grit. Rod shaped agglomerates about 6 millimeters long (¼ inch) were recovered. SEM examination of the particles showed the glass to have flowed well and wetted the grits.

Example 2

By volume 4 parts 351 CUBITRON grain (3M, St. Paul, Minn.) was mixed with 1 part ¼ inch fiberglass chopped strand (US Composites Inc., West Palm Beach, Fla.). This mix was placed in 4 porcelain crucibles. The crucibles containing this mix were placed in a muffle oven; heated to 1100° C. and held there for 75 minutes before the furnace was turned off and allowed to cool. The content of the crucibles was screened on a Rotap screener with a nest of 12, 14, and 30 mesh screens. The +12 mesh material was lightly crushed in 4 inch roll crusher with a large (approx 2-3 millimeters) roll gap. This crushed material was then screened with the same screen nest as above. The total output was: +12 mesh 84.8 g, −12+14 mesh 170.1 g, −14+20 mesh 236 g, −20+30 mesh, 71.5 g, −30 mesh 1150 g. The −20+30 mesh fraction consisted of agglomerates containing about 3 to 8 individual grits. The −30 mesh was predominately individual grits.

Examples 3-25

Glass input materials for Examples 3-25 are identified in Table 1 below.

TABLE 1

| Glass | Source |
| --- | --- |
| Owens-Corning CS691A ⅛ inch | Owens Corning, Toledo, Ohio |
| Owens-Corning CS691A 1/16 inch | Owens Corning, Toledo, Ohio |
| St. Gobain Vetrotex Chopped Strand 97D-A4 ¼ inch | Saint-Gobain Vetrotex America, Inc., Valley Forge, Pennsylvania |
| Clear Plate Glass Fines | American Specialty Glass Inc., North Salt Lake City, Utah |
| Crystal Clear Glass Fines | American Specialty Glass Inc., North Salt Lake City, Utah |
| Clear Bead Fines | American Specialty Glass Inc., North Salt Lake City, Utah |
| −30 mesh Silica Sand Substitute | American Specialty Glass Inc., North Salt Lake City, Utah |
| Ferro 3225 | Ferro Corporation, Cleveland, Ohio |
| Ferro 3226 | Ferro Corporation, Cleveland, Ohio |
| Ferro 3227 | Ferro Corporation, Cleveland, Ohio |
| Ferro XP150 | Ferro Corporation, Cleveland, Ohio |
| Johns Manville fiberglass batt insulation (2 inch thick) | Johns Manville Corporation, Denver, Colorado |

Test Procedures

Swing Arm Test

The abrasive disc to be evaluated was attached to a 20.3 centimeter circular backup plate, commercially available as Part No. 05114145192 from 3M Company. The backup plate was then secured to a testing device obtained under the trade designation "SWING ARM TESTER" from Reel Manufacturing, Centerville, Minn., using a metal screw fastener. A 1.897 millimeter thick mild steel disc shaped work piece with a 30.5 centimeter diameter was weighed and secured to the testing device with a metal fastener. During each test, the steel workpiece was applied to the abrasive article disc with a force of 39.2 Newtons. The abrasive article disc was rotated at 3500 revolutions per minute (rpm), and the workpiece was placed against the disc at an angle of 7 degrees for 8 minutes, while the workpiece was rotated at 2 rpm. The amount of steel removed (total cut) and weight loss of each abrasive disc (i.e., shelling) was recorded.

Slide Action Test

The Slide Action Test was designed to measure the cut rate of the coated abrasive disc. The abrasive disc to be tested was used to grind the face of a 1.25 centimeter by 18 centimeter 1018 mild steel workpiece. The grinder used was a constant load hydraulic disc grinder. The constant load between the workpiece and the abrasive disc was provided by a load spring. The back-up pad for the grinder was an aluminum back-up pad, beveled at approximately 7 degrees, extending from the edge and in towards the center 3.5 centimeter. The disc was secured to the aluminum pad by a retaining nut and was driven at 5,500 rpm. The load between the back-up pad and disc and workpiece was about 6.8 kg. Each disc was used to grind a separate workpiece for a 60 second interval. The initial cut was the amount of metal removed in the first 60 seconds of grinding. Unless otherwise noted, total cut is the total amount of metal removed during the test; total cut in grams is reported. The grinding performance data is based on an average of three discs unless otherwise noted.

Comparative Examples A and B

Comparative Examples A and B were "988CR Grade 50 Fibre Disc, 7 in×⅞ in", obtained from 3M Company, St. Paul, Minn.

Examples 3-8

Fibrous Glass Source

Agglomerates using fibrous glass sources were prepared as follows. 1500 grams of grade 50 CUBITRON 321 (obtained from 3M, St. Paul, Minn.) and 60 grams chopped glass fiber were combined and mixed together for 3 minutes using a Hobart Food Mixer using a flat beater at low speed. Sufficient water was added to the mix so that the mineral/fiberglass mixture would hold together in a mass when squeezed in the palm of your hand.

The resulting mixture was split into two equal parts and each half was packed into an 8½ inch×4¼ inch×2 inch alumina sagger. The two saggers were stacked on top of one another and placed in a Fischer Scientific "IsoTemp" programmable muffle furnace and fired to 1000° C. at heat-up rate of 5° C./min. Once the samples reached 1000° C., they were allowed to soak at temperature for 2 hours. After 2 hours, the kiln shutdown and the sample gradually cooled to room temperature.

Once fired, the agglomerated mixture of fiberglass and abrasive resembled a bird's nests, which were removed from the alumina saggers. Each agglomerated mixture was placed in a topmost screen of a stack of USA Standard Testing Sieves consisting of a 10, 18, 20, 25, 30 mesh screens. To the #10 screen was also added numerous ½ inch alumina milling media cylinders, which aided in the breakup of the "bird's nest" into individual agglomerates. The stack of screens was placed in a sieve shaker ("Ro-Tap Model RX-29", W.S. Tyler Particle Analysis, Filtration and Industrial Screening Products—Mentor, Ohio) for minutes. The individual screen cuts were then recovered.

The agglomerates from the −18+20 screen cut were electrostatically coated on fiber disc backings using a standard calcium carbon filled make and cryolite filled size resin. A separate batch of discs were electrostatically coated using 50/50 w/w blend of the −20+25 and −25+30 screen cut using the same the resin.

Example discs were tested using the Swing Arm Test. The results are reported in Table 2.

Examples 9 and 10

Fibrous Glass Source

Examples 9 and 10 were prepared identically to Examples 3-8 except that 222 Cubitron was substituted in place of 321 Cubitron.

Examples 11-14

Recycled Glass Source

Examples 11-14 were prepared using recycled glass sources. Agglomerates were prepared by combining 1500 grams of grade 50 Cubitron 321 and 50 grams recycled glass. The two components were mixed together for 3 minutes using a Hobart Food Mixer using a flat beater at low speed. Sufficient water was added to the mix so that the mineral/fiberglass mixture would hold together in a mass when squeezed in the palm of your hand.

The resulting mixture was split into two equal parts and each half was packed into an alumina sagger. The two saggers were stacked on top of one another and placed in a programmable Fischer Scientific Box kiln and fired to 800° C. at heat-up rate of 5° C./min. Once the samples reached 800° C., they were allowed to soak at temperature for 2 hours. After 2 hours, the kiln shutdown and the fired agglomerates gradually cooled to room temperature.

The Examples were graded and subsequently coated onto fiber discs in an identical fashion to Examples 3-8, described above.

Example discs were tested using the Swing Arm Test. The results are reported in Table 2.

Examples 15-24

Glass Frit Source

Agglomerates were prepared by combining 1500 grams of grade 50 CUBITRON 321 and 50 grams of glass frit. The two components were mixed together for 3 minutes using a Hobart Food Mixer using a flat beater at low speed. Sufficient water was added to the mix so that the mineral/fiberglass mixture would hold together in a mass when squeezed in the palm of your hand.

The resulting mixture was split into two equal parts and each half was packed into an alumina sagger. The two saggers were stacked on top of one another and placed in a programmable Fischer Scientific Box kiln. Each lot was heated to a temperature 50° C. higher than the softening temperature designated above. The heat-up rate for each sample was 5° C./min. Once the examples reached temperature, they were allowed to soak at that temperature for 2 hours. After 2 hours, the kiln was shut down and the Example gradually cooled to room temperature.

The Examples were graded and coated onto fiber discs in an identical fashion to Examples 3-8, described above except that the −18+20 fraction was drop coated rather than electrostatically coated. Example discs were tested using the Swing Arm Test. The results are reported in Table 2.

Examples 15-24 were tested on the Slide Action Test. Each disc was ground for 15 1-minute intervals using 1018 mild steel workpieces. In addition, 3M 988CR discs were included as a control for the test. The metal removed after each minute interval was recorded and is reported in FIGS. 7 and 8.

Example 25

Example 25 was prepared much like one would prepare lasagna. Fiberglass insulation batting (originally 2 inches thick) was pulled apart into several thin layers. Into the bottom of an individual 8½ inch×4¼ inch×2 inch alumina sagger, a thin layer of alumina grit was sprinkled followed by a layer of insulation followed by another layer of alumina grit and then insulation. This was continued until the alternating layers filled the sagger. Periodically during the process, weight was applied to the mixture in order to tamp down the mix and therefore pack more layers into the sagger. Once two saggers were filled, they were stacked on top of one another and placed in a Fischer Scientific "IsoTemp" programmable muffle furnace and fired to 700° C. at heat-up rate of 5° C./min. Once the samples reached 700° C., they were allowed to soak at temperature for 2 hours. After 2 hours, the kiln was shut down and the sample gradually cooled to room temperature.

Figure 4:
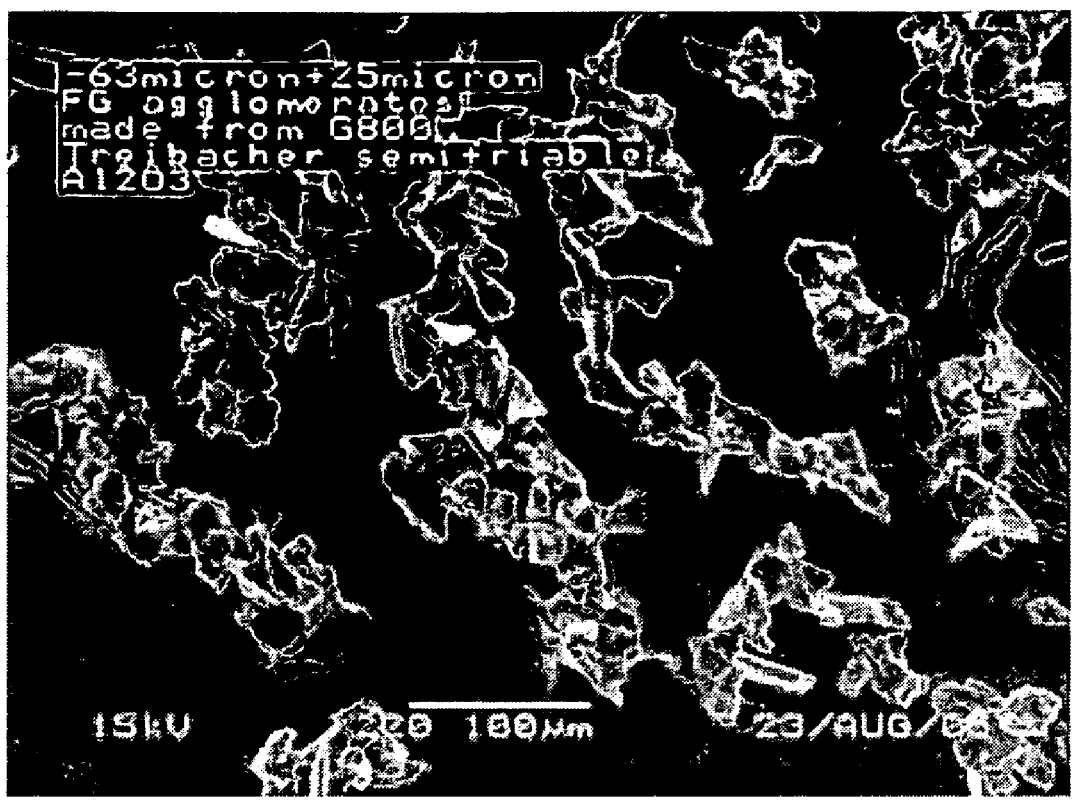
FIG. 4 is a photomicrograph of an abrasive agglomerate according to the present disclosure, wherein the glass binder is made from fiberglass.

After heat treatment, the mixture had shrunk to about ¼ of its original volume. The agglomerated "birds nest" was brittle and could easily be broken by hand into smaller pieces which were then placed into a mortar and pestle and further ground into powder. This powder was hand sifted through 100 mesh USA Standard Testing screen in order to retain the −100 screen fraction. This −100 screen fraction was further sifted through 66 micron and 25 micron screens using a sonic sifter. A photo showing the −66 micron +25 micron screen fiberglass agglomerate is shown in FIG. 4.

TABLE 2

| Example | Glass Source | Particle | Agglomerate Size | Firing Temperature | Total Cut after 8 minutes (grams) | Weight Loss after 8 minutes (grams) |
|---|---|---|---|---|---|---|
| Comparative A (988CR) | no agglomerates | Grade 50 Cubitron 222 | | N/A | 127.0 | 5.9 |
| 3 | Owens Corning CS691A ⅛ inch | Grade 50 Cubitron 321 | −18+20 | 1000 | 234.4 | 6.6 |

TABLE 2-continued

| Example | Glass Source | Particle | Agglomerate Size | Firing Temperature | Total Cut after 8 minutes (grams) | Weight Loss after 8 minutes (grams) |
|---|---|---|---|---|---|---|
| 4 | Owens Corning CS691A ⅛ inch | Grade 50 Cubitron 321 | 50% −20+25, 50% −25+30 | 1000 | 242.4 | 3.6 |
| 5 | Owens Corning CS691A 1/16 inch | Grade 50 Cubitron 321 | −18+20 | 1000 | 234.4 | 4.7 |
| 6 | Owens Corning CS691A 1/16 inch | Grade 50 Cubitron 321 | 50% −20+25, 50% −25+30 | 1000 | 234.7 | 3.8 |
| 7 | St. Gobain Chopped Strand 97D-A4 ¼ inch | Grade 50 Cubitron 321 | −18+20 | 1000 | 260.6 | 5.7 |
| 8 | St. Gobain Chopped Strand 97D-A4 ¼ inch | Grade 50 Cubitron 321 | 50% −20+25, 50% −25+30 | 1000 | 258.3 | 3.8 |
| 9 | St. Gobain Chopped Strand 97D-A4 ¼ inch | Grade 50 Cubitron 222 | −18+20 | 1000 | 231.9 | 6.4 |
| 10 | St. Gobain Chopped Strand 97D-A4 ¼ inch | Grade 50 Cubitron 222 | 50% −20+25, 50% −25+30 | 1000 | 251.1 | 3.5 |
| 11 | Clear Plate Glass Fines | Grade 50 Cubitron 321 | 50% −20+25, 50% −25+30 | 800 | 189.3 | 2.8 |
| 12 | Crystal Clear Glass Fines | Grade 50 Cubitron 321 | 50% −20+25, 50% −25+30 | 800 | 200.0 | 2.6 |
| 13 | Clear Bead Fines | Grade 50 Cubitron 321 | 50% −20+25, 50% −25+30 | 800 | 199.4 | 2.6 |
| 14 | −30 mesh Silica Sand Substitute | Grade 50 Cubitron 321 | 50% −20+25, 50% −25+30 | 800 | 190.0 | 2.8 |
| Comparative B (988CR) | No agglomerates | Grade 50 Cubitron 222 | ANSI G-50 loose grain | N/A | 262.3 | 3.2 |
| 15 | Ferro 3227 | Grade 50 Cubitron 321 | −18+20 | 750 | 289.8 | 6.9 |
| 16 | Ferro 3227 | Grade 50 Cubitron 321 | 50% −20+25, 50% −25+30 | 750 | 246.8 | 3.3 |
| 17 | Ferro 3227 | Grade 50 Cubitron 321 | −18+20 | 700 | 275.0 | 6.3 |
| 18 | Ferro 3227 | Grade 50 Cubitron 321 | 50% −20+25, 50% −25+30 | 700 | 231.5 | 3.5 |
| 19 | Ferro 3226 | Grade 50 Cubitron 321 | −18+20 | 850 | 258.9 | 5.7 |
| 20 | Ferro 3226 | Grade 50 Cubitron 321 | 50% −20+25, 50% −25+30 | 850 | 247.0 | 3.2 |
| 20 | Ferro 3225 | Grade 50 Cubitron 321 | −18+20 | 950 | 281.1 | 6.8 |
| 22 | Ferro 3225 | Grade 50 Cubitron 321 | 50% −20+25, 50% −25+30 | 950 | 256.8 | 3.8 |
| 23 | Ferro XF150 | Grade 50 Cubitron 321 | −18+20 | 850 | 265.0 | 4.5 |

TABLE 2-continued

| Example | Glass Source | Particle | Agglomerate Size | Firing Temperature | Total Cut after 8 minutes (grams) | Weight Loss after 8 minutes (grams) |
|---|---|---|---|---|---|---|
| 24 | Ferro XF150 | Grade 50 Cubitron 321 | 50% −20+25, 50% −25+30 | 850 | 234.1 | 3.0 |
| 25 | Johns Manville 2 inch fiberglass batt | Treibacher G800 semi-friable alumina | −66 micron +25 micron | 700 | — | — |

What is claimed is:

1. A method of making a plurality of abrasive agglomerates comprising:
   providing a plurality of glass bodies comprising glass fibers, each glass body having a defined shape, said glass bodies having a softening temperature;
   providing a plurality of abrasive grains;
   mixing said plurality of glass bodies with said plurality of abrasive grains to form a mixture; the mixture comprising 0 grams of water or a temporary liquid binder, or the mixture comprising about 1 gram to about 5 grams of water or a temporary liquid binder per 100 grams of abrasive grains;
   heating said mixture to said softening temperature so that said glass bodies soften while substantially retaining said defined shape, wherein said abrasive grains adhere to said softened glass bodies to form a plurality of abrasive agglomerates wherein a majority of each adhered abrasive grain is exposed and not encapsulated within said softened glass bodies; and
   cooling said abrasive agglomerates so that said glass bodies harden.

2. A method according to claim 1, wherein said glass fibers are at least about 2 times larger than said abrasive grains by having a length L that is at least about 2 times greater than a size of said abrasive grains.

3. A method according to claim 1, wherein the step of providing the plurality of abrasive grains includes providing an excess of abrasive grains of at least about 2 parts abrasive grains per 1 part glass bodies, by volume.

4. A method according to claim 1, wherein the step of providing the plurality of abrasive grains includes providing an excess of abrasive grains of at least about 4 parts abrasive grains per 1 part glass bodies, by volume.

5. A method according to claim 1, wherein the heating step include heating said mixture to a temperature of between about 300° C. and about 1500° C.

6. A method according to claim 1, wherein the heating step includes heating said mixture to said softening temperature for between about 1 hour and about 3 hours.

7. A method according to claim 3, further comprising the step of separating said abrasive agglomerates from the excess of abrasive grains.

8. A method according to claim 7, wherein the separating step includes selecting a mesh screen having openings smaller than said abrasive agglomerates and larger than said abrasive grains to sift said abrasive agglomerates from said excess of abrasive grains.

9. A method according to claim 1, further comprising the step of breaking said abrasive agglomerates into smaller sizes.

10. A method according to claim 1 wherein the glass fibers comprise a length between about 1/32 inch and about 3/8 inch.

11. A method according to claim 1 wherein the mixture comprises between about 2 grams to about 4 grams of water or a temporary liquid binder per 100 grams of abrasive grains.

* * * * *

UNITED STATES PATENT AND TRADEMARK OFFICE
CERTIFICATE OF CORRECTION

PATENT NO. : 7,887,608 B2
APPLICATION NO. : 12/138498
DATED : February 15, 2011
INVENTOR(S) : Mark George Schwabel et al.

It is certified that error appears in the above-identified patent and that said Letters Patent is hereby corrected as shown below:

Column 1
Line 10, after "disclosure" insert -- of --.

Column 6
Line 62, delete "terrous" and insert -- ferrous --, therefor.

Column 9
Line 67, delete "ethylencially" and insert -- ethylenically --, therefor.

Column 12
Line 7, delete "Kgf" and insert -- $Kg_f$ --, therefor.

Signed and Sealed this
Nineteenth Day of April, 2011

David J. Kappos
*Director of the United States Patent and Trademark Office*